(12) United States Patent
Chon

(10) Patent No.: US 7,729,729 B2
(45) Date of Patent: Jun. 1, 2010

(54) METHOD FOR DISPLAYING INFORMATION IN A MOBILE COMMUNICATION TERMINAL

(75) Inventor: Hong-Chun Chon, Ulwang-si (KR)

(73) Assignee: Samsung Electronics Co., Ltd (KR)

( * ) Notice: Subject to any disclaimer, the term of this patent is extended or adjusted under 35 U.S.C. 154(b) by 455 days.

(21) Appl. No.: 10/989,696

(22) Filed: Nov. 16, 2004

(65) Prior Publication Data

US 2005/0113145 A1     May 26, 2005

(30) Foreign Application Priority Data

Nov. 21, 2003   (KR) ............... 10-2003-0083061
Sep. 1, 2004    (KR) ............... 10-2004-0069577

(51) Int. Cl.
    *H04M 1/00* (2006.01)
(52) U.S. Cl. .................. 455/566; 455/575.3
(58) Field of Classification Search .......... 455/730,
         455/786.1, 786.2, 31.1, 38.1, 382, 384, 566,
                    455/575, 550.1, 575.1, 575.2, 575.3
    See application file for complete search history.

(56) References Cited

U.S. PATENT DOCUMENTS

| | | | | |
|---|---|---|---|---|
| 6,040,829 A * | 3/2000 | Croy et al. | .................. | 715/864 |
| 6,133,853 A * | 10/2000 | Obradovich et al. | ........ | 340/905 |
| 6,161,026 A * | 12/2000 | Uchida | ....................... | 455/566 |
| 6,370,391 B1 * | 4/2002 | Lietsalmi et al. | ............ | 455/466 |
| 6,728,546 B1 * | 4/2004 | Peterson et al. | ............. | 455/462 |
| 6,993,362 B1 * | 1/2006 | Aberg | ......................... | 455/566 |
| 7,107,077 B2 * | 9/2006 | Lee | ............................ | 455/566 |
| 7,441,034 B2 * | 10/2008 | Tsurusaki et al. | ........... | 709/227 |
| 2003/0008686 A1 * | 1/2003 | Park et al. | .................... | 455/566 |
| 2003/0153283 A1 * | 8/2003 | Kuwazoe | ..................... | 455/90 |
| 2003/0181228 A1 * | 9/2003 | Kim | ........................ | 455/575.3 |
| 2003/0211872 A1 * | 11/2003 | Meins et al. | ............ | 455/575.1 |
| 2005/0020301 A1 * | 1/2005 | Lee | ......................... | 455/556.1 |

FOREIGN PATENT DOCUMENTS

| | | |
|---|---|---|
| KR | 2001-0011028 | 2/2001 |
| KR | 2003-0052543 | 6/2003 |

* cited by examiner

*Primary Examiner*—Nhan T Le
(74) *Attorney, Agent, or Firm*—The Farrell Law Firm, LLP

(57) ABSTRACT

Disclosed is a method for displaying various information on a display section of a mobile communication terminal to efficiently utilize a screen in a standby state of the mobile communication terminal. The mobile communication terminal alternately displays basic information and user information set by the user on a display section through dividing display time thereof. Thus, the user repeatedly views basic information, which is basically displayed on the display section, and special information to be remembered or memorized. The display section is used for language study and schedule display. The method allows the mobile communication terminal to match with various demands of the users, so that efficiency of the mobile communication terminal is improved.

12 Claims, 9 Drawing Sheets

(a)

(b)

(c)

(d)

(a)

(b)

(c)

(d)

(e)

METHOD FOR DISPLAYING INFORMATION IN A MOBILE COMMUNICATION TERMINAL

This application claims priority to an application entitled "Method For Displaying Information In Mobile Communication Terminal" filed in the Korean Intellectual Property Office on Nov. 21, 2003 and assigned Serial No. 2003-83061, and on Sep. 1, 2004 and assigned Serial No. 2004-69577, the contents of which are hereby incorporated by reference.

BACKGROUND OF THE INVENTION

1. Field of the Invention

The present invention relates to a mobile communication terminal, and more particularly to a method for displaying information in a display section of a mobile communication terminal.

2. Description of the Related Art

Recently, as mobile communication terminals have been widely used, various services, such as traffic information services informing drivers of traffic situations through a screen of a mobile communication terminal while a vehicle is in motion, MY-BELL services allowing users to register special ringer sounds in their mobile phones, and message transmission services notifying users of an arrival of a message in a voice mail system by transmitting characters to a user's mobile phone, have been provided. Since such mobile communication terminals are equipped with various functions, such as a voice mail receiving function and a special information receiving function allowing users to receive various supplementary services from service providers, users of the mobile communication terminals may use various functions of the mobile communication terminals in addition to a basic communication function thereof.

The variety of such services and supplementary functions for the mobile communication terminal have gradually increased. In addition, as a screen size of the mobile communication terminal increases, the number of pixels used in the mobile communication terminal has gradually increased. Accordingly, it is necessary to effectively use and variously utilize the screen of the mobile communication terminal. In order to cope with various demands of users while increasing an effective value of the screen, it is necessary to utilize the screen in conjunction with various services and supplementary functions of the mobile communication terminal. For example, when a user inputs a short sentence via input keys, a conventional mobile communication terminal sequentially displays each word of the short sentence in a screen or displays the short sentence on a sliding manner. Such a displaying method is effective if the user inputs only one short sentence. According to the above displaying method, the conventional mobile communication terminal may continuously display only one short sentence, so the effective value of the screen is lowered.

As described above, when the user inputs the short sentence via input keys, the conventional mobile communication terminal sequentially displays each word of the short sentence on the screen or displays the short sentence in a sliding manner. However, such a displaying method of the conventional mobile communication terminal is limited, such as when displaying information about English study which the user must memorize, or when displaying various information specially required by the user. In addition, according to the conventional displaying method, the mobile communication terminal cannot alternately display various information on the screen thereof and cannot display information in various manners.

SUMMARY OF THE INVENTION

Accordingly, the present invention has been made to solve the above-mentioned problems occurring in the prior art, and an object of the present invention is to provide a method for alternately displaying basic information and various information including data downloaded or inputted by a user in a display section of a mobile communication terminal.

To accomplish the above object, there is provided a method for displaying data in a mobile communication terminal having a display section, the method comprising the steps of: determining at least two items of information to be displayed on a screen as a screen-image display list; and alternately displaying basic information of the display section and at least one item of information contained in the screen-image display list according to a predetermined time period.

BRIEF DESCRIPTION OF THE DRAWINGS

The above object and other features and advantages of the present invention will be more apparent from the following detailed description taken in conjunction with the accompanying drawings, in which:

FIGS. 6A to 7E are views showing various images shown on a screen for setting a private screen-image display function in a mobile communication terminal according to one embodiment of the present invention;

DETAILED DESCRIPTION OF THE PREFERRED EMBODIMENTS

Figure 1:
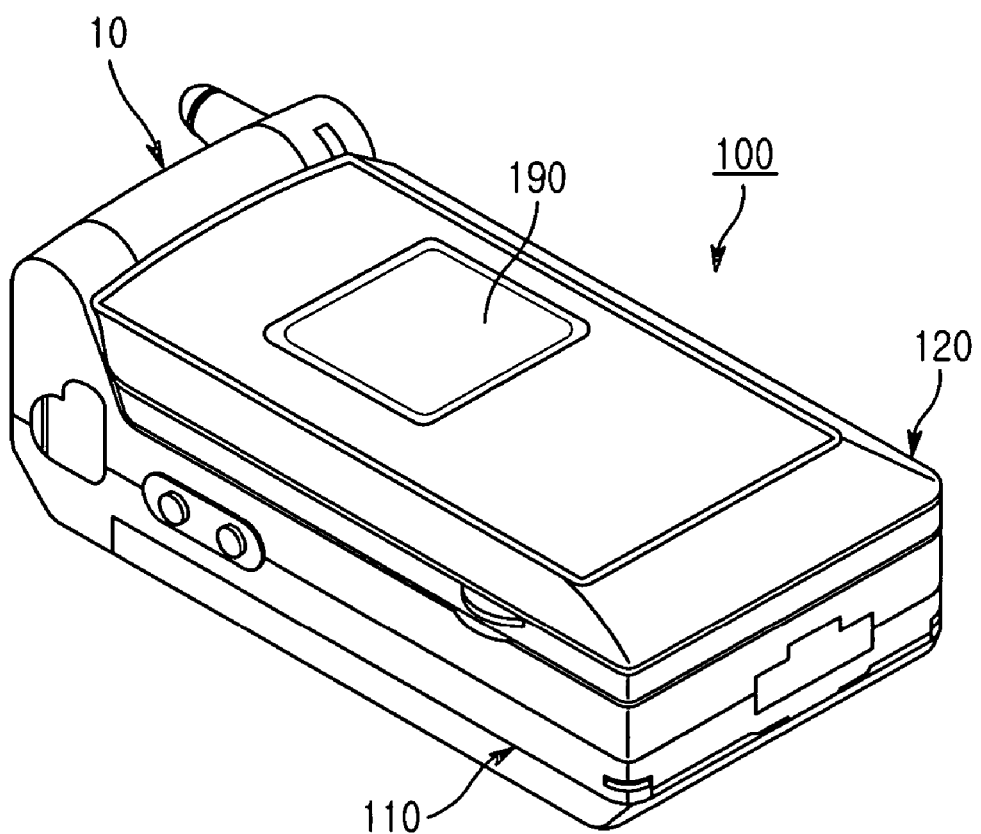
FIG. 1 is a perspective view showing a mobile communication terminal according to one embodiment of the present invention when a sub-body is in a closed position with respect to a main body.

Hereinafter, preferred embodiments of the present invention will be described with reference to the accompanying drawings. In the following description of the present invention, the same reference numerals are used to designate the same or similar components. A detailed description of known functions and configurations incorporated herein will be omitted when it may make the subject matter of the present invention unclear.

Figure 2:
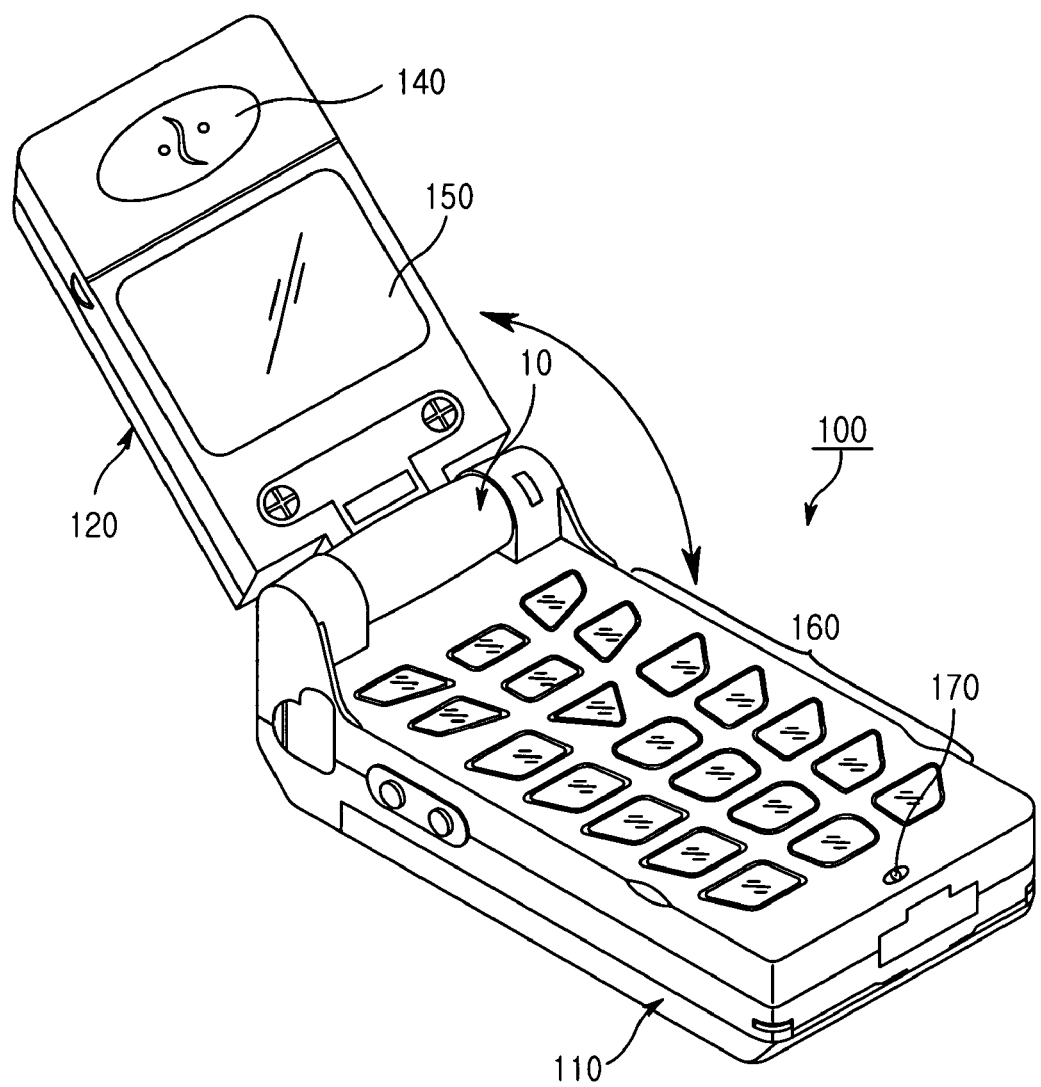
FIG. 2 is a perspective view showing the mobile communication terminal on FIG. 1 when the sub-body is in an open position with respect to the main body.

FIG. 1 is a perspective view showing a folder-type mobile communication terminal 100 when a sub-body 120 is in a closed position with respect to a main body 110, wherein a method of the present invention is applied to the folder-type mobile communication terminal, and FIG. 2 is a perspective view showing the folder-type mobile communication terminal 100 when the sub-body 120 is in an open position with respect to the main body 110.

Referring to FIGS. 1 and 2, the folder-type mobile communication terminal 100 includes the main body 110, the sub-body 120 rotatably coupled to the main body 110, and a hinge device 10 for allowing the sub-body 120 to rotatably move with respect to the main body 110. Generally, as shown in FIG. 2, an earpiece section 140 is formed at a predetermined position of the sub-body 120 and an internal display section 150 is provided below the earpiece section 140 in order to display data. In addition, a keypad 160 having a plurality of key buttons for inputting data for display on the internal display section 150 is provided in the main body 110. Installed below the keypad 160 is a microphone device 170 to facilitate voice communication with other users. As shown in FIG. 1, an external display section 190 is provided in an outer portion of the sub-body 120.

Figure 3:
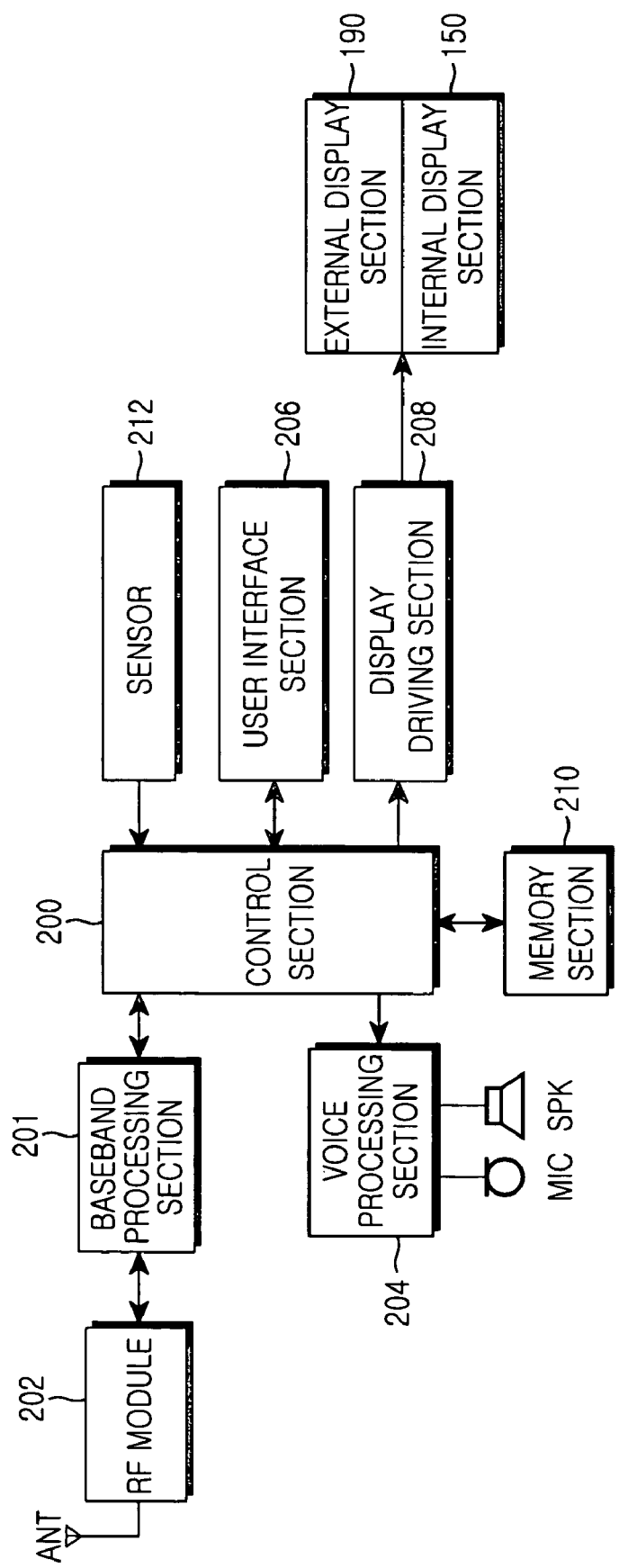
FIG. 3 is a block diagram showing components of a mobile communication terminal according to one embodiment of the present invention.

FIG. 3 is a block diagram showing components of the folder-type mobile communication terminal 100. Referring to FIG. 3, the folder-type mobile communication terminal 100 includes a control section 200 for controlling an operation of the folder-type mobile communication terminal 100. The control section 200 controls the internal display section 150 and the external display section 190 to display information stored in a memory section 210 to match predetermined conditions. Such predetermined conditions include a user information display time, which is set by a user according to the present invention, and a display circulation period of corresponding information. The user information display time is determined based on a display time division value, which is set according to a basic information display time basically displayed in the display section. The display circulation period signifies a period for displaying at least one item of user information. In addition, the control section 200 determines whether information must be displayed in the internal display section 150 or must be displayed in the external display section 190 according to a selection of the user. That is, the control section 200 displays user information in the internal display section 150 or external display section 190 according to the predetermined display circulation period and display time division value.

The control section 200 stores information downloaded or inputted by the user in the memory section 210 and performs a control operation for sequentially, periodically and repeatedly displaying information stored in the memory section 210.

The memory section 210 includes a RAM and a ROM for storing information and a plurality of programs to control the operation of the mobile communication terminal 100. In addition, the memory section 210 stores downloaded information and information inputted or registered by the user. Such information includes information directly generated by the user using a tool, information available from various routes, such as an Internet, and information provided by content providers to the mobile communication terminal. For example, user information includes English, Korean or other foreign language words and English colloquial literature to be studied by the user, or a user's schedule. If information includes voice or mobile data, the user can set the mobile communication terminal to output the voice while displaying such information. In addition, the mobile communication terminal can download or receive such information in various manners. For instance, the user can receive various services, such as MMS (Multi Media Service), SMS (Short Message Service), information services provided by contents providers, and information download services, which the user can directly download by using a PC tool, through various manners as required by the user.

In addition, an RF module 202 receives/transmits an RF signal from/to a base station through an antenna (ANT). At this time, the RF module 202 converts the RF signal into an IF (Intermediate Frequency) signal and outputs the IF signal to a baseband processing section 201. In addition, the RF module 202 converts the IF signal inputted from the baseband processing section 201 into the RF signal and transmits the RF signal to a base station. The baseband processing section 201 is a baseband analog Application Specific Integrated Circuit (ASIC) providing an interface between the control section 200 and the RF module 202. That is, the baseband processing section 201 converts a baseband digital signal transmitted from the control section 200 into an analog IF signal and sends the IF signal to the RF module 202. In addition, the baseband processing section 201 converts the analog IF signal inputted from the RF module 202 into the baseband digital signal and sends the baseband digital signal to the control section 200.

A user interface section 206 includes a plurality of numeral keys and functional keys and outputs key input data to the control section 200 in response to an input of keys by the user. In addition, a display driving section 208 allows the external display section 190 and/or internal display section 150 to display downloaded information or information inputted or registered by the user under the control of the control section 200. A sensor 212 detects whether the sub-body 120 of the folder-type mobile communication terminal 100 having the external display section 190 and the internal display section 150 is opened or closed and sends detected information to the control section 200.

Hereinafter, a private screen-image display function of the mobile communication terminal according to the present invention will be described with reference to FIGS. 4 to 7E.

Figure 4:
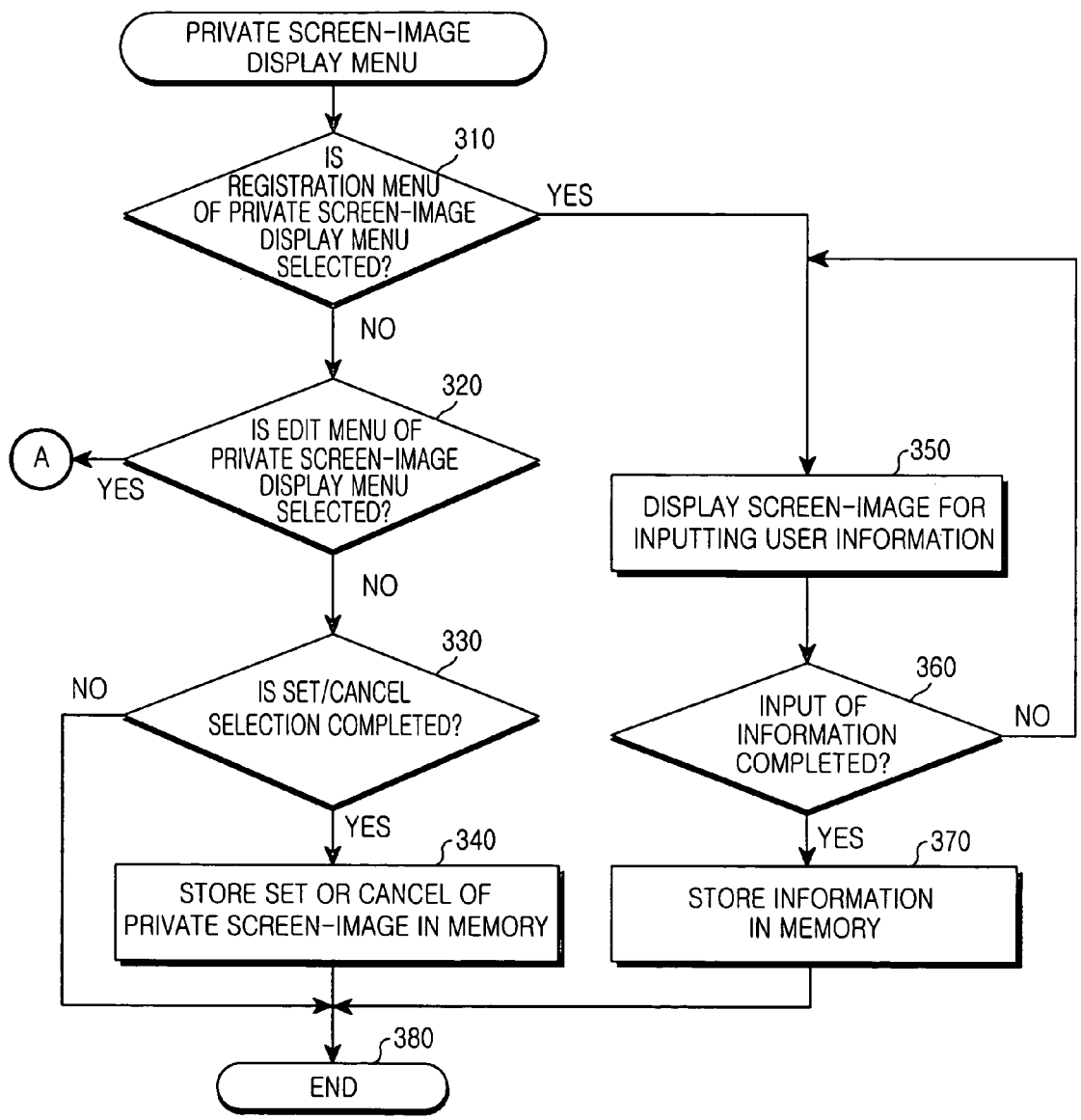
FIGS. 4 and 5 are flowcharts showing a procedure for setting a private screen-image display function in a mobile communication terminal according to one embodiment of the present invention.
Figure 5:
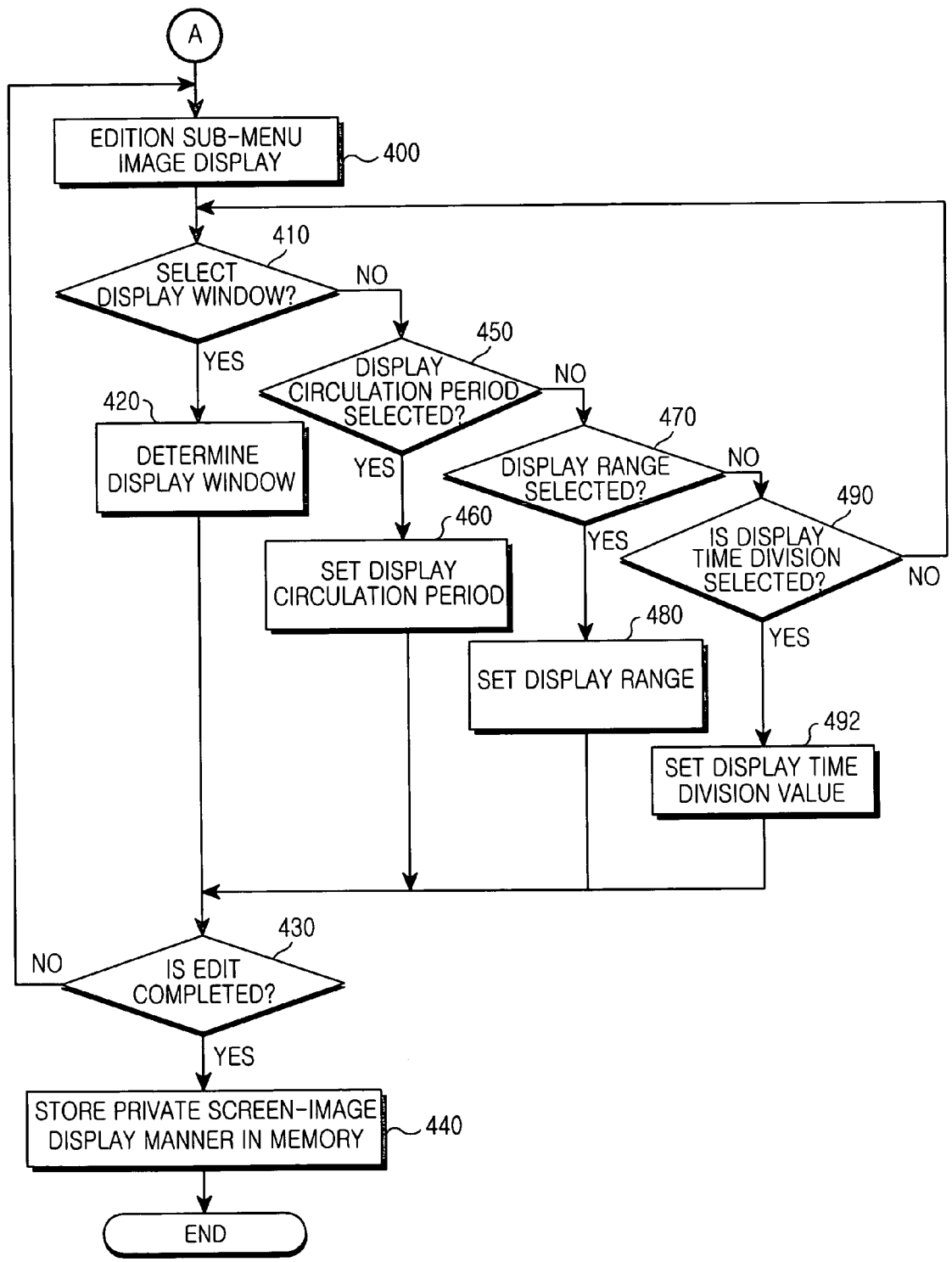

FIGS. 4 and 5 are flowcharts showing a procedure for setting the private screen-image display function in the mobile communication terminal according to one embodiment of the present invention, and FIGS. 6A to 7E are views showing various images shown on a screen for setting the private screen-image display function in the mobile communication terminal according to one embodiment of the present invention.

Figure 6:
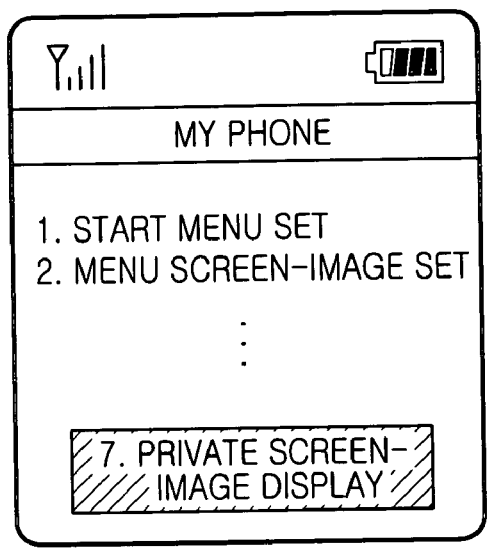
Figure 6:
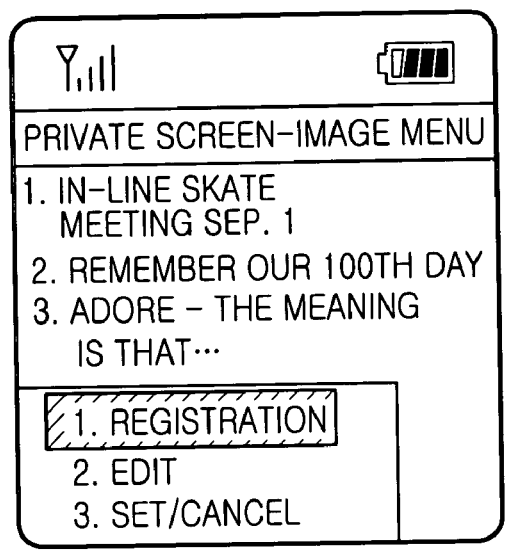
Figure 6:
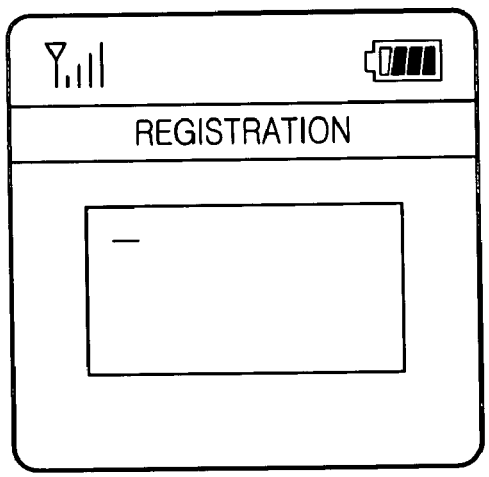
Figure 6:
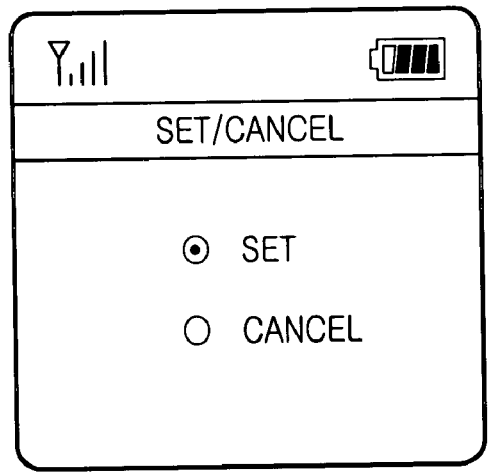

Referring to FIGS. 4 to 7E, if the user selects a key for a main menu through a key input section, the control section 200 displays the main menu in a screen as shown in FIG. 6A. Thus, the user can select a sub-menu of the main menu, such as "7. private screen-image display", for setting the private screen-image display function after checking a main menu list from the main menu.

In this state, if the user selects a key corresponding to a private screen-image display, the control section displays a private screen-image menu in the screen. As shown in FIG. 6B, the private screen-image menu is displayed in the internal display section 150 under the control of the control section 200. Referring to FIG. 6B, the private screen-image menu includes an information list downloaded or stored by the user and a sub-menu list thereof. The sub-menu list includes various sub-menus, such as "1. registration", "2. edit" and "3. set/cancel". The sub-menu of "1. registration" is used when the user directly registers or stores information in the private screen-image menu, the sub-menu of "2. edit" is used to edit the private screen-image menu as required by the user, and the sub-menu of "3. set/cancel" is used to set or cancel registered or stored information.

As shown in FIG. 6B, the control section 200 determines whether the user selects the sub-menu corresponding to "1. registration" of the private screen-image menu (step 310). If the user selects the sub-menu corresponding to "1. registration" of the private screen-image menu, the control section 200 displays a screen-image for allowing the user to input information to be registered in the private screen-image menu as shown in FIG. 6C (step 350). In this state, the user can directly input various kinds of information into the screen-image, such as English study contents or events to be remembered. Then, the control section 200 determines whether the user has inputted information to be registered in the private screen-image menu (step 360). If the user has inputted information in the image-screen, the control section 200 registers such information in the private screen-image menu and stores it in the memory section 210 (step 370).

In addition, as shown in FIG. 6B, the control section 200 determines whether the user selects the sub-menu corresponding to "2. edit" of the private screen-image menu (step 320). If the user selects the sub-menu corresponding to "2. edit" of the private screen-image menu, the control section 200 performs step 400 as shown in FIG. 5. A symbol "A" shown in FIGS. 4 and 5 represents that step 400 of FIG. 5 follows step 320 of FIG. 4. The sub-menu of "2. edit" shown in the private screen-image is for setting the display section, in which user information is displayed, a display circulation period of user information, and display time division rate of user information and basic information.

In addition, as shown in FIG. 6D, the control section 200 determines whether the user selects the sub-menu corresponding to "3. set/cancel" of the private screen-image menu (step 330). If the user selects "set" or "cancel" from the sub-menu of the private screen-image menu, the control section 200 stores the selected menu in the memory section (step 340). After that, the control section 200 finishes editing the private screen-image (step 380).

Figure 7:
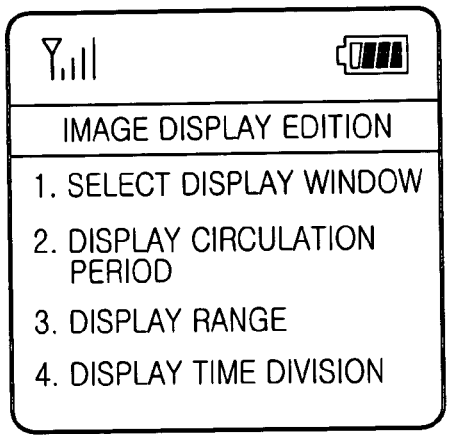
Figure 7:
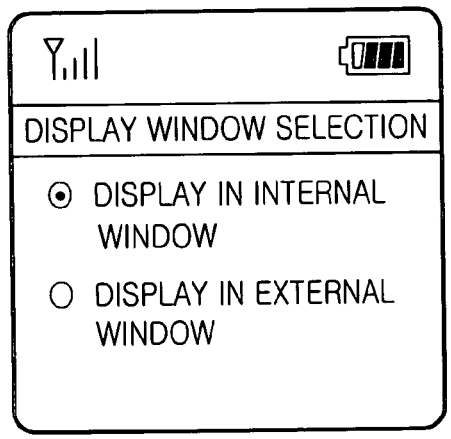
Figure 7:
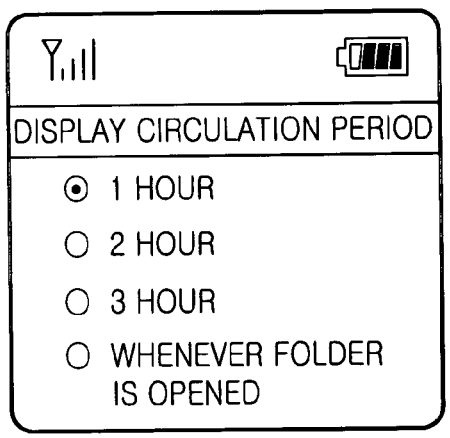
Figure 7:
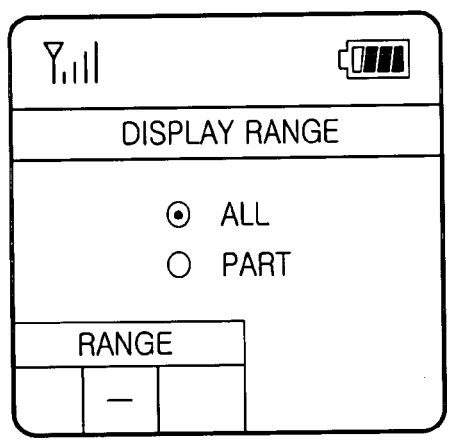
Figure 7:
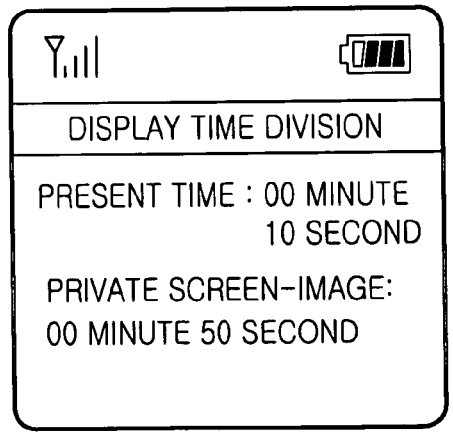

Hereinafter, an operation of the mobile communication terminal 100 and images shown in the mobile communication terminal according to the private screen image edited by the user will be described with reference to FIGS. 5 and 7. When the user selects the sub-menu corresponding to "2. edit" of the private screen-image menu, the control section 200 displays the sub-menu list corresponding to the private screen image edit in the internal display section 150 as shown in FIG. 7A (step 400). The sub-menu list of the private screen image edit includes "1. select display window", "2. display circulation period", "3. display range" and "4. display time division" for editing the private screen-image, as shown in FIG. 7A.

Referring to FIG. 5, after displaying the sub-menu list of the private screen image edit, the control section 200 determines whether the user selects "1. select display window" (step 410). If the user selects "1. select display window", the control section 200 displays menus, such as "display in internal window" and "display in external window", in the internal display section 150 as shown in FIG. 7B. If the user selects the internal window display or external window display, the control section 200 sets the selected window as a display window (step 420).

Then, the control section 200 displays user information for the private screen-image display in the internal display section 150 or external display section 190 through the display driving section 208. For instance, if the user selects "display in external window", the control section 200 alternately displays user information and basic information for the private screen-image display through the external display section 190 when the mobile communication terminal is in a standby state or when the sub-body is in a closed position with respect to the main body. In addition, if the user selects "display in internal window", the control section 200 alternately displays user information and basic information for the private screen-image display through the internal display section 150 only when the sub-body is in an open position with respect to the main body.

If the user does not select the menu "select display window", the control section 200 determines whether the user selects the menu "2. display circulation period" (step 450). If the user selects the menu "2. display circulation period", the control section displays a menu list of "2. display circulation period", such as "1 hour", "2 hour", "3 hour", and "whenever folder is opened" as shown in FIG. 7C, in the internal display section 150. When the user selects one display circulation period, the control section 200 sets the selected display circulation period (step 460). For instance, if the user selects a time period, such as "1 hour", the control section 200 displays the private screen-image in the display section while sequentially changing the private screen-image based on changed user information according to the selected period of time. In addition, if the user selects the menu "whenever folder is opened", the control section displays the private screen-image in the display section by changing private screen-image information whenever the folder is opened.

If the user does not select the menu "2. display circulation period", the control section 200 determines whether the user selects the menu "3. display range" (step 470). The menu "3. display range" is for selecting items of user information to be displayed as shown in FIG. 7D. For instance, when the user wants to sequentially display only three items of user information according to the display circulation period even if user information includes ten items, the user selects a menu "part" shown in FIG. 7D instead of "all". Then, the control section 200 displays an input window for allowing the user to input the display range, so the user can input the display range, such as 1-3, by using the input window.

If the user does not select the menu "3. display range", the control section 200 determines whether the user selects the menu "4. display time division" (step 490). When the user selects the menu "4. display time division", the control section 200 displays a screen-image for inputting time duration for displaying present time and time duration for displaying private screen-image. Then, the control section 200 receives the time duration for displaying present time and the private screen-image selected by the user and sets a display time division value for present time and the private screen-image based on the selection of the user (step 492). Herein, time information according to the present invention includes not only present time information, but also basic information, which the mobile communication terminal generally displays in a standby mode, such as battery charge level and Received Signal Strength Indication (RSSI).

Referring to FIG. 7E, the time duration for displaying the private screen-image is set to 50 seconds and the time duration for displaying present time is set to 10 seconds. Based on such time duration, the display time division value is determined. That is, according to the time duration of 10 seconds for displaying present time and the time duration of 50 seconds for displaying the private screen-image, the control section 200 alternately displays basic information and user information for the private screen-image display in the display section in a ratio of 10:50.

In addition, the control section 200 determines whether the user selects an edit end key for the private screen-image (step 430). If the user selects the edit end key, the control section 200 stores the private screen-image display manner, which is set through steps 410 to 492, in the memory section 210 (step 440). If the user does not select the edit end key, the procedure returns to step 400.

Figure 8:
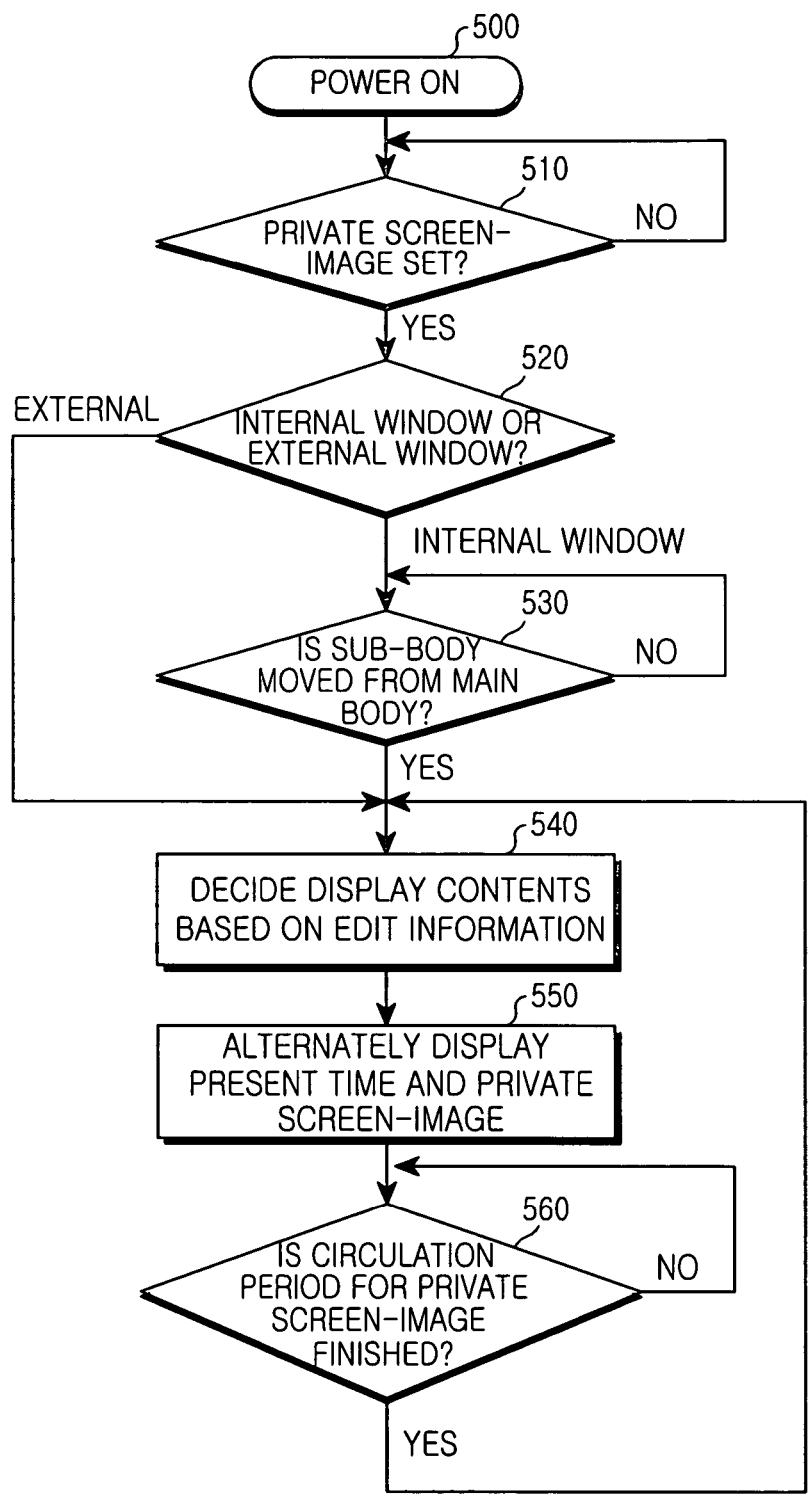
FIG. 8 is a flowchart showing a procedure for performing a private screen-image display function in a mobile communication terminal according to one embodiment of the present invention.

Hereinafter, a procedure for displaying private screen-image display information in the internal display section 150 and/or the external display section 190 of the mobile communication terminal 100 as the user sets the private screen-image display function in the mobile communication terminal 100 will be described with reference to FIG. 8. FIG. 8 is a flowchart showing the procedure for performing the private screen-image display function in the mobile communication terminal according to one embodiment the present invention. Although the present embodiment is adaptable for a mobile communication terminal having two display sections, the present embodiment is also applicable for mobile communication terminal having one display section.

When power is supplied to the mobile communication terminal 100 (step 500), the control section 200 determines whether the user sets the private screen-image display function in the mobile communication terminal 100 (step 510). As mentioned above, the user can set or cancel the private screen-image display function. Then, the control section 200 determines whether the user selects the "internal window" or the "external window" (step 520). If the user selects the "internal window", the control section 200 determines whether the sub-body is in the open position with respect to the main body (step 530). If the sub-body is in the open position with respect to the main body, the control section 200 performs step 540. In addition, if the user selects the "external window" in step 520, the control section performs step 540.

Then, the control section 200 determines items of user information to be displayed on the display section according to private screen-image edit information, which is set by the user (step 540). For example, the control section 200 selects a first item of user information and displays the first item as user information for displaying the private screen-image during the display circulation period. In addition, when time duration for the display circulation period lapses, the control section 200 selects a second item of user information and displays the second item as user information. After that, the control section 200 alternately displays present time information and the private screen-image in the display section based on the time division value (step 550). As mentioned above, if time duration for displaying present time is set to 10 seconds and time duration for displaying the private screen-image is set to 50 seconds by the user, the control section 200 alternately displays present time information and user information for the private screen-image display in the display section in a ratio of 10:50.

Then, the control section determines whether the display circulation period of the private screen-image lapses (step 560). For instance, when the display circulation period is set to "1 hour", the control section 200 displays the selected private screen-image in the display section for 1 hour, and then displays a next private screen-image according to a predetermined order when the display circulation period of "1 hour" lapses. If the display circulation period is set to "whenever the folder is opened", the control section 200 sequentially changes the private screen-image according to the predetermined order whenever the folder is opened.

According to the above embodiment, the mobile communication terminal may alternately display user information and basic information on the display section for the private screen-image display.

Meanwhile, a user may wish to access the private screen-image display list while the basic information is being displayed on the display section of the mobile communication terminal. To this end, according to another embodiment of the present invention, the mobile communication terminal changes information related to the private screen-image display list according to a predetermined condition while continuously displaying the basic information on the display section. Hereinafter, another embodiment of the present invention will be described with reference to FIG. 9.

Figure 9:
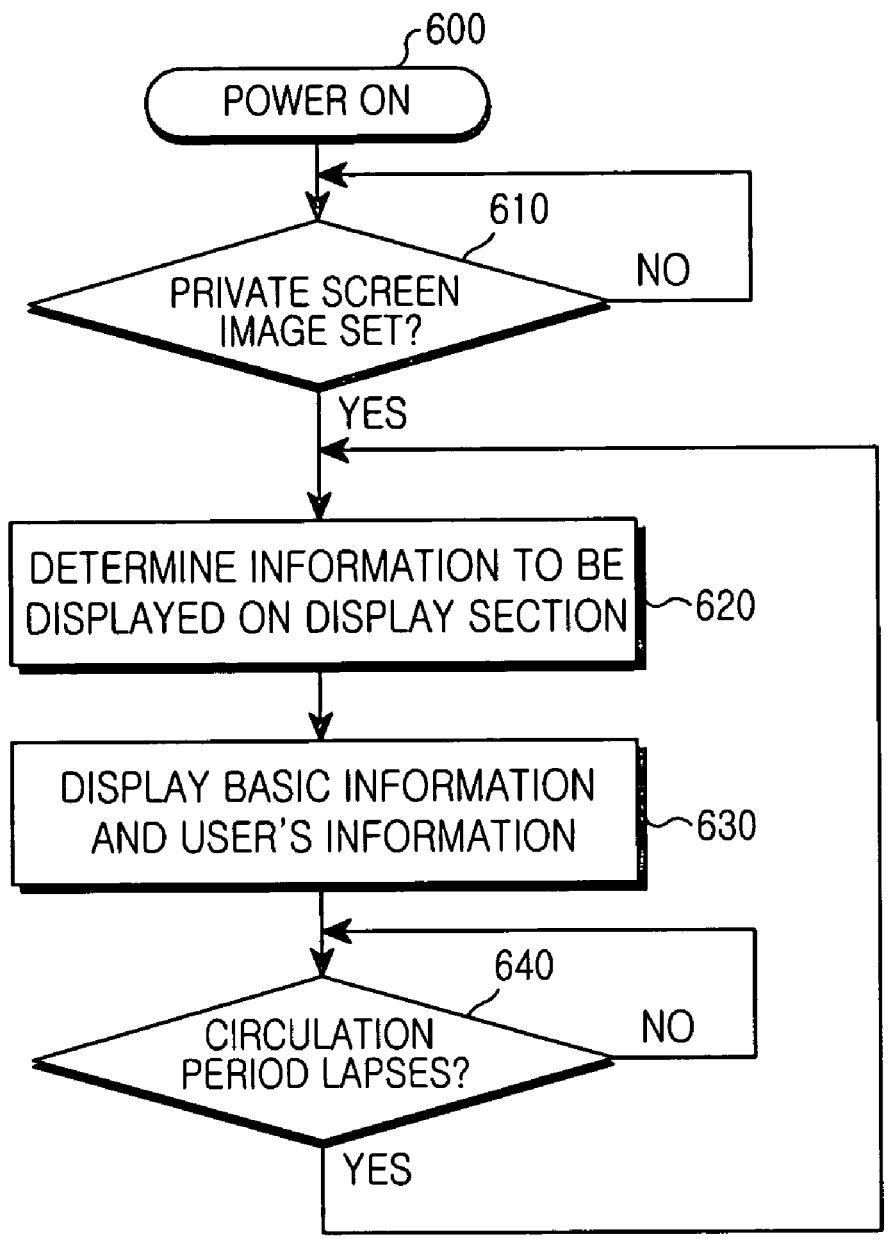
FIG. 9 is a flowchart showing a procedure for performing a private screen-image display function in a mobile communication terminal according to another embodiment of the present invention.

FIG. 9 is a flowchart showing a procedure for performing a private screen-image display function in a mobile communication terminal according to another embodiment of the present invention.

Referring to FIG. 9, when power is supplied to the mobile communication terminal (step 600), the control section 200 determines whether the user has set the private screen-image display function in the mobile communication terminal 100 (step 610). As mentioned above, the user can set or cancel the private screen-image display function. Then, the control section 200 determines items of user information to be displayed on the display section according to private screen-image edit information, which is set by the user (step 620). Herein, the private screen-image edit information includes a display circulation period and a display range. That is, user information displayed on display section 150 or 190 of the mobile communication terminal may be determined according to the private screen-image edit information.

For instance, if a display circulation period of the user information displayed on the display section lapses, the control section 200 displays a next private screen-image according to a predetermined order. Then, the control section 200 displays basic information and user information on display section 150 or 190 of the mobile communication terminal (step 630). The control section 200 preferably displays user information by varying the user information according to a predetermined condition, that is, according to the private screen-image edit information, while continuously displaying the basic information on the display section. Herein, the basic information includes present time information, battery power information, RSSI information, and message (SMS, MMS, Emergency Message Service (EMS), etc.) reception/transmission information.

The control section 200 can separately display the basic information and the user information by dividing a screen of the display section into a basic information display part and a user information display part. In addition, the control section 200 can display the basic information in the vicinity of the user information while displaying the user information at a center of the display section in such a manner that the basic information does not conceal the user information. After that, the display section 200 determines whether the display circulation period of the private screen-image has lapsed (step 640). As mentioned above, the control section 200 can replace the user information displayed on the display section with the next private screen-image according to a predetermined order. For example, the control section 200 may exchange the user information displayed on the display section with the next private screen-image when the predetermined display circulation period lapses.

In the present embodiment, the predetermined condition signifies a lapse of the predetermined display circulation period. However, the predetermined condition may include an opening of a folder, an incoming call, an outgoing call, or transmission/reception of a message. That is, the predetermined condition may be an event occurring in the display section of the mobile communication terminal and recognized by a user. For example, in step 640, the control section can recognize the predetermined condition by determining whether the incoming call is received or a folder is opened.

Therefore, according to another embodiment of the present invention, the mobile communication terminal changes the private screen-image in the event of a predetermined condition, while continuously displaying basic information on the display section.

As described above, according to the present invention, the user can set the private screen-image function in the mobile communication terminal for displaying user information. In addition, information downloaded or directly inputted by the user can be variously displayed in the display section of the mobile communication terminal by setting such information through various editing functions. That is, the mobile communication terminal can repeatedly display information to be remembered or memorized by the user through the display section of the mobile communication terminal while allowing the user to variously edit information displayed on the display section of the mobile communication terminal. Accordingly, the mobile communication terminal matches various demands of the users, so that efficiency of the mobile communication terminal may be improved. In addition, the mobile communication terminal can be used for the purpose of study, such as language study.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for displaying information on a screen of a display section in a mobile communication terminal having the display section, the method comprising the steps of:

determining at least two items of user information to be displayed on the screen as a screen-image display list according to a selection of a user; and alternately displaying basic information of the mobile communication terminal and at least one item of the user information contained in the screen-image display list according to a predetermined time period, the at least two items of the user information being sequentially displayed according to a display circulation period, storing information downloaded or inputted by a user in the screen-image display list.

2. The method as claimed in claim 1, wherein the screen-image display list includes English study information and schedule information.

3. The method as claimed in claim 1, further comprising receiving the predetermined time period from a user.

4. The method as claimed in claim 1, wherein the basic information includes at least one of present time information, battery power information, RSSI information, and message reception/transmission information.

5. The method as claimed in claim 4, wherein the message reception/transmission information includes Short Message Service, Multi Media Service and Emergency Message Service information.

6. A method for displaying data in a folder-type mobile communication terminal having a main body, a sub-body movable from a closed position to an open position with respect to the main body, a first display section formed at an internal portion of the sub-body, and a second display section formed at an external portion of the sub-body, the method comprising the steps of:

determining at least two items of user information to be displayed on a screen as a screen-image display list according to a selection of a user;

allowing a user to select one of the first and second display sections for displaying information thereon; and alternately displaying basic information of a selected display section and any one of the items of user information contained in the screen-image display list on the selected display section according to a predetermined time period, the items of the user information being sequentially displayed one by one according to a display circulation period.

7. The method as claimed in claim 6, further comprising receiving the predetermined time period from the user.

8. A method for displaying information on a screen of a display section in a mobile communication terminal having the display section, the method comprising the steps of:

determining at least two items of user information to be displayed on the screen as a screen-image display list according to a selection of a user; and continuously displaying basic information on the mobile communication terminal, and displaying at least one item of the user information while sequentially changing information according to a predetermined conditions wherein the nredetermined condition includes a lanse of a nredetermined display circulation period, an opening of a folder, an incoming call, an outgoing call, or transmission/reception of a message.

wherein the predetermined condition includes an event occurring in the display section of the mobile communication terminal and recognized by the user, and wherein the event occurring in the display section and recognized by the user is reception of the incoming call and opening of the folder.

9. The method as claimed in claim 8, further comprising storing information downloaded or inputted by a user in the screen-image display list.

10. The method as claimed in claim 8, wherein the screen-image display list includes English study information and schedule information.

11. The method as claimed in claim 8, wherein the basic information includes at least one of present time information, battery power information, RSSI information, and message reception/transmission information.

12. The method as claimed in claim 11, wherein the message reception/transmission information includes Short Message Service, Multi Media Service and Emergency Message Service information.

* * * * *